UNITED STATES PATENT OFFICE.

WILLIAM HAZEN, OF MILWAUKEE, WISCONSIN.

IMPROVED PROCESS OF TREATING STEEL TO RENDER IT TOUGHER, STRONGER, AND MORE ELASTIC.

Specification forming part of Letters Patent No. 44,310, dated September 20, 1864; Reissue No. 1,833, dated December 13, 1864.

*To all whom it may concern:*

Be it known that I, WILLIAM HAZEN, of the city of Milwaukee and State of Wisconsin, have discovered and invented a new and Improved Process of Treating Steel for the Purpose of Rendering it Tougher, Stronger, and more Elastic, of which the following is a specification.

The nature of my discovery and invention consists in subjecting steel, when prepared in any form, size, or shape desired for use, (and under the conditions hereinafter described,) to a bath composed of several combined chemical agencies, so that the mass is permanently permeated thereby, and new and valuable qualities are imparted to the original metal. This discovery and invention may be applied to steel springs used in railway carriages and locomotives with great benefit, and also to all other steel springs and articles of steel or implements made of steel when the conditions of toughness, strength, and elasticity are required.

To enable others skilled in the arts most nearly allied to this to prepare and treat steel after my improved plan, I will here describe the mode of procedure by which I have been enabled to attain the result.

I first prepare a chemical bath consisting of a liquor or fluid, in which the steel is to be subjected to treatment, in the following manner: I mix together in the quantity of water required to thoroughly dissolve and combine the same the ingredients aqua-ammonia, copperas, (sulphate of iron,) and sal-ammoniac, which materials may be employed in varying proportions, but that which I have found to answer best, and to which it is desirable to approximate in forming the compound, is two ounces of aqua-ammonia, two ounces of copperas, (sulphate of iron,) and two pounds of sal-ammoniac. I subject the composition in a kettle or other convenient vessel to a boiling-heat, with the requisite quantity of water, as aforesaid, for the purpose, until all is thoroughly dissolved. I then mix the quantity aforesaid with about one hundred and twenty gallons of water, or approximating that quantity, more or less, to which I add about six gallons of animal-oil.

For convenience in practice I use a wooden box or trough about five feet in length by two feet in width and two feet in depth. Fill this trough with the desired quantity of water and oil, as before set forth, and pour into and mix with it the solution or liquor prepared as above. The chemical bath thus prepared will possess the virtue for treating successfully a quantity of steel of about six thousand pounds, when the bath must be impregnated anew for further successful operation.

In order to subject the different plates, articles, or implements of steel to the successful operation of this chemical bath, they must be heated to a cherry-red heat, which may be done in an oven of any of the usual forms or sizes most convenient. When so heated to a cherry-red heat, they are all to be plunged, by means of tongs or other convenient tool or equivalent arrangement, edgewise into the bath above described, so that they may be acted upon equally and uniformly upon all sides by the chemical agents aforesaid, and should be so kept and held in the bath until entirely cold. They are then returned to the oven and there reheated until light pine wood will burn on the surface, when oil is to be burned into the steel *ad libitum.*

This process has been successfully applied by me to locomotive and railway-carriage springs, and I have found practically that it will render them twice as tough, strong, and elastic as any other known process, so that there is a saving of one-half in the quantity of steel used and in the weight and size of those now ordinarily used; and the same effect will be produced upon all steel articles or implements subjected to this treatment.

What I claim, and desire to secure by Letters Patent as my invention, is—

1. The treatment of steel, so as to render the same tougher, stronger, and more elastic, by immersion in a bath or solution of combined chemical agencies, substantially as described, and for the purpose set forth.

2. The process of treating steel by the combination of aqua-ammonia, sulphate of iron, and sal-ammoniac in solution, substantially as described, and for the purpose set forth.

WILLIAM HAZEN.

Witnesses:

STEPHEN A. GOODWIN,
JAMES A. COWLES.